(12) United States Patent
Yang et al.

(10) Patent No.: US 9,295,031 B2
(45) Date of Patent: Mar. 22, 2016

(54) METHOD, APPARATUS, AND BASE STATION SUBSYSTEM FOR PAGING TERMINAL IN MULTI-BAND NETWORK

(71) Applicant: HUAWEI TECHNOLOGIES CO., LTD., Shenzhen (CN)

(72) Inventors: Guang Yang, Shenzhen (CN); Liqun Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 252 days.

(21) Appl. No.: 13/974,492

(22) Filed: Aug. 23, 2013

(65) Prior Publication Data

US 2013/0337851 A1     Dec. 19, 2013

Related U.S. Application Data

(60) Provisional application No. PCT/CN2012/071319, filed on Feb. 20, 2012.

(30) Foreign Application Priority Data

Feb. 24, 2011   (CN) .......................... 2011 1 0045390

(51) Int. Cl.
*H04W 68/00*     (2009.01)
*H04W 68/02*     (2009.01)
(Continued)

(52) U.S. Cl.
CPC .............. *H04W 68/02* (2013.01); *H04W 68/00* (2013.01); *H04W 68/12* (2013.01); *H04W 88/06* (2013.01)

(58) Field of Classification Search
CPC .... H04W 68/02; H04W 68/00; H04W 68/005

USPC .......................................................... 455/458
See application file for complete search history.

(56) References Cited

U.S. PATENT DOCUMENTS

| 8,509,801 B1* | 8/2013 | Wang et al. .................. 455/453 |
| 2006/0073846 A1* | 4/2006 | Drury et al. ................. 455/552.1 |

FOREIGN PATENT DOCUMENTS

| CN | 1518367 A | 8/2004 |
| CN | 101123809 A | 2/2008 |

(Continued)

OTHER PUBLICATIONS

PCT International Search Report and Written Opinion of the International Searching Authority mailed May 24, 2012 in corresponding International Application No. PCT/CN2012/071319.

(Continued)

*Primary Examiner* — Omoniyi Obayanju
(74) *Attorney, Agent, or Firm* — Staas & Halsey LLP (57) ABSTRACT

Embodiments of the present invention provide a method, an apparatus, and a base station subsystem for paging a terminal in a multi-band network. The method includes: obtaining a frequency band support capability of the terminal, where the frequency band support capability is information about one or multiple frequency bands supported by the terminal; if the terminal supports multiple frequency bands, obtaining a corresponding frequency band for the terminal according to the preset rule; and page the terminal on the obtained corresponding frequency band. In the embodiments of the present invention, the base station subsystem, according to the rule, can determine a redirected frequency band for a multi-band terminal and accurately page the multi-band terminal on the redirected frequency band, thereby the consumption of network capacity is reduced.

9 Claims, 3 Drawing Sheets

(51) Int. Cl.
*H04W 68/12* (2009.01)
*H04W 88/06* (2009.01)

(56) References Cited

FOREIGN PATENT DOCUMENTS

| CN | 101860963 A | 10/2010 |
| CN | 102123498 A | 7/2011 |
| JP | 2008-193592 | 8/2008 |

OTHER PUBLICATIONS

Chinese Office Action mailed Feb. 1, 2013 in corresponding Chinese Application No. 201110045390.0.
International Search Report mailed May 24, 2012 in corresponding International Application No. PCT/CN2012/071319.

* cited by examiner

METHOD, APPARATUS, AND BASE STATION SUBSYSTEM FOR PAGING TERMINAL IN MULTI-BAND NETWORK

CROSS-REFERENCE TO RELATED APPLICATION

This application is a continuation of International Application No. PCT/CN2012/071319, filed on Feb. 20, 2012, which claims priority to Chinese Patent Application No. 201110045390.0, filed on Feb. 24, 2011, both of which are hereby incorporated by reference in their entireties.

TECHNICAL FIELD

Embodiments of the present invention relate to the field of communication technologies, and in particular, to a method, an apparatus, and a base station subsystem for paging a terminal in a multi-band network.

BACKGROUND

In the communication market, more and more operators seek an alliance to improve competitiveness. Because different operators generally have different frequency bands, a scenario of overlay network working of multiple frequency bands, namely, a multi-band network, occurs. In addition, in a city with a dense population and large traffic, overlay network working of multiple frequency bands is needed, so that there is adequate capacity.

In a scenario of overlay network working of multiple frequency bands, according to the number of frequency bands supported by a terminal, terminals may be classified into single-band terminals and multi-band terminals, where a single-band terminal supports only one frequency band, and a multi-band terminal can support multiple frequency bands. For a single-band terminal, a base station subsystem (Base Station Subsystem, hereinafter briefly referred to as BSS) may store a frequency band supported by the terminal. When performing paging, the BSS, according to the stored frequency band, determines a frequency point where the terminal resides. For a multi-band terminal, however, the BSS cannot accurately know a frequency point where the terminal currently resides. The reasons are that: (1) generally, a multi-band terminal first searches for a preferable frequency point set in a PRL, and after locking the preferable frequency point, the terminal, according to a frequency point channel list, determines a frequency point to reside; however, a PRL is generally set at the factory or when being sold, and a network side (namely, the BSS) does not have information in the PRL; and (2) in a moving process, after a multi-band terminal moves to a blind point within the coverage of the frequency point, the terminal reselects another frequency band, and after locking a new frequency point, the terminal starts to reside in the new frequency point; the BSS, however, does not know this process.

The BSS cannot accurately know the frequency band where the multi-band terminal currently resides. Therefore, to page the multi-band terminal, the BSS, when paging the multi-band terminal in an existing multi-band network, hashes a frequency point in each frequency band supported by the terminal for paging the terminal. As a result, the paging consumption in the multi-band network is much larger than the paging consumption in a single-band network, thereby leading to a waste of network capacity and causing poor paging accuracy.

SUMMARY

Embodiments of the present invention provide a method, an apparatus, and a base station subsystem for paging a terminal in a multi-band network, so as to accurately page the terminal in the multi-band network and reduce consumption of network capacity.

An embodiment of the present invention provides a method for paging a terminal in a multi-band network, including:
  sending a service redirection broadcast message according to a preset rule, so as to enable a terminal to redirect to a corresponding frequency band supported by the terminal according to the service redirection broadcast message;
  obtaining a frequency band support capability of the terminal, where the frequency band support capability is information about one or multiple frequency bands supported by the terminal;
  if the terminal is a multi-band terminal, obtaining the corresponding frequency band for the terminal according to the preset rule; and
  paging the terminal on the corresponding frequency band.

An embodiment of the present invention provides an apparatus for paging a terminal in a multi-band network, including:
  a redirection broadcast sending module, configured to send a service redirection broadcast message according to a preset rule, so as to enable a terminal to redirect to a corresponding frequency band supported by the terminal according to the service redirection broadcast message;
  a capability obtaining module, configured to obtain a frequency band support capability of the terminal, where the frequency band support capability is information about one or multiple frequency bands supported by the terminal;
  a frequency band obtaining module, configured to: if the terminal supports multiple frequency bands, obtain the corresponding frequency band for the terminal according to the preset rule; and
  a first paging module, configured to page the terminal on the corresponding frequency band which is obtained by the frequency band obtaining module.

An embodiment of the present invention provides a base station subsystem, including any one of the apparatuses for paging a terminal in a multi-band network that are provided by the embodiments of the present invention.

According to the method, apparatus, and base station subsystem for paging a terminal in a multi-band network in the embodiments of the present invention, a base station subsystem sends a service redirection broadcast message according to a preset rule, so as to enable a terminal to redirect to a corresponding frequency band for according to the service redirection broadcast message; the base station subsystem obtains a frequency band support capability of the terminal, and then the base station subsystem obtains the corresponding frequency band for the multi-band terminal according to the preset rule, and pages the terminal on the obtained corresponding frequency band. The base station subsystem sends the redirection broadcast message to the terminal according to the preset rule. Therefore, for a multi-band terminal, the base station subsystem, according to the rule, can determine a redirected frequency band for the terminal. In this way, the base station subsystem can page the terminal on the frequency band, thereby accurately paging the terminal and reducing consumption of network capacity.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more clearly, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art according to the embodiments of the present invention without creative efforts shall fall within the protection scope of the present invention.

Figure 1:
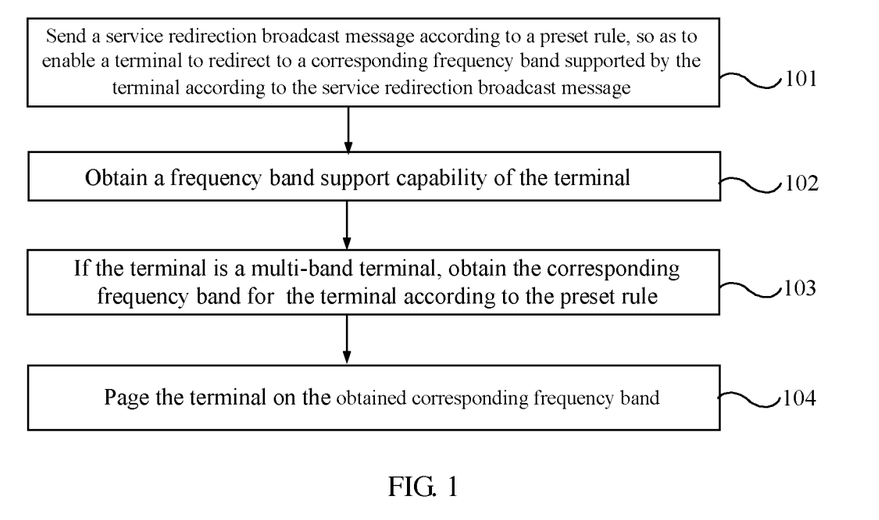
FIG. 1 is a flowchart of a method for paging a terminal in a multi-band network according to Embodiment 1 of the present invention.

FIG. 1 is a flowchart of a method for paging a terminal in a multi-band network according to Embodiment 1 of the present invention. As shown in FIG. 1, the method includes:

Step 101: Send a service redirection broadcast message according to a preset rule, so as to enable a terminal to redirect to a corresponding frequency band supported by the terminal according to the service redirection broadcast message.

The embodiment of the present invention may be applied to a multi-band network. The executor of this embodiment may be a base station subsystem (Base Station Subsystem, hereinafter briefly referred to as BSS).

A BSS sends a service redirection broadcast message according to a preset rule, so as to enable each terminal served by the BSS to be capable of performing service redirection after receiving the service redirection broadcast message, so that the terminal redirects to a corresponding frequency band supported by the terminal. For example, the multi-band network includes k frequency bands, and all terminals served by the BSS may be classified into k groups according to the rule and then, terminals in each group redirect to a corresponding frequency band, thereby enabling the k groups of terminals to separately correspond to k frequency bands.

After receiving the service redirection broadcast message sent by the BSS, the multi-band terminal redirects to a corresponding frequency band according to a rule in the broadcast message, so as to comply with a regulation in the rule. For a single-band terminal, the terminal supports only one frequency band; therefore, it cannot perform frequency band redirection according to the broadcast message.

Step 102: Obtain a frequency band support capability of the terminal, where the frequency band support capability is information about one or multiple frequency bands supported by the terminal.

When the BSS needs to page a terminal, the BSS first obtains a frequency band support capability of the terminal. The frequency band support capability is information about one or multiple frequency bands supported by the terminal. If a terminal supports only one frequency band, the terminal is a single-band terminal. If a terminal supports more than one frequency band, the terminal is a multi-band terminal.

The BSS may obtain the frequency band support capability of the terminal from a mobile switching center (Mobile Switching Center, hereinafter briefly referred to as MSC) or may also query the frequency band support capability of the terminal from a common channel.

Step 103: If the terminal is a multi-band terminal, obtain the corresponding frequency band for the terminal according to the preset rule.

If the BSS determines that the terminal which needs to be paged is a multi-band terminal according to the obtained frequency band support capability of the terminal, the BSS, according to the preset rule, may obtain a group to which the terminal belongs, thereby obtaining a corresponding frequency band for the terminal Step 104: Page the terminal on the obtained corresponding frequency band.

The BSS, according to the rule in the service redirection broadcast message, obtains the corresponding frequency band for the terminal, and then pages the terminal on this frequency band.

If the terminal which needs to be paged is a single-band terminal, the BSS pages the terminal directly on the corresponding frequency band.

In the embodiment of the present invention, a BSS sends a service redirection broadcast message according to a preset rule, so as to enable a terminal to redirect to a corresponding frequency band supported by the terminal according to the service redirection broadcast message; the BSS obtains a frequency band support capability of the terminal, and then the BSS obtains a corresponding frequency band for a multi-band terminal according to the preset rule, and pages the multi-band terminal on the obtained corresponding frequency band. The BSS sends the redirection broadcast message to the multi-band terminal according to the preset rule. Therefore, for a multi-band terminal, the BSS, according to the rule, can determine a redirected frequency band for the multi-band terminal. In this way, the BSS can page the multi-band terminal on the frequency band, thereby accurately paging the multi-band terminal and reducing consumption of network capacity.

Figure 2:
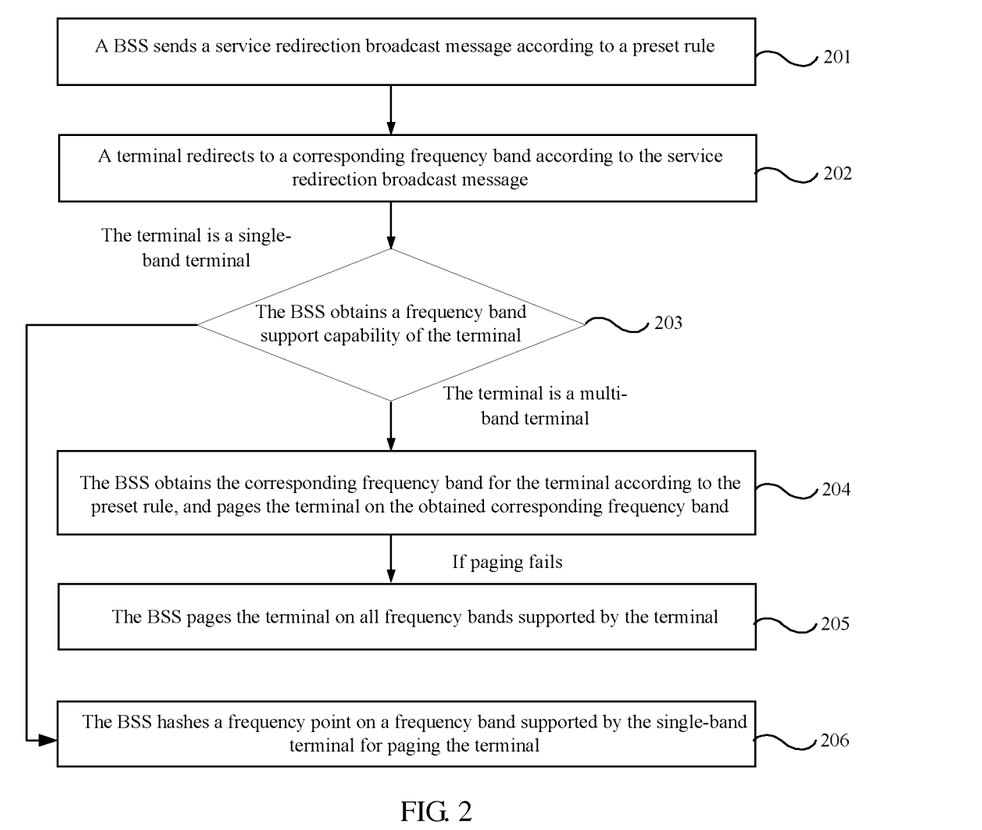
FIG. 2 is flowchart of a method for paging a terminal in a multi-band network according to Embodiment 2 of the present invention.

FIG. 2 is a flowchart of a method for paging a terminal in a multi-band network according to Embodiment 2 of the present invention. As shown in FIG. 2, the method includes:

Step 201: A BSS sends a service redirection broadcast message according to a preset rule.

The embodiment of the present invention may be applied to a multi-band network.

The preset rule may be that: the multi-band network includes k frequency bands, where k is larger than 1; terminals in the multi-band network are classified into k groups, and k groups of terminals separately correspond to k frequency bands. Specifically, this step may be that: on the ith frequency band, the BSS sends a service redirection broadcast message that is used to instruct k-1 groups of terminals except the ith group of terminals to separately redirect to k-1 frequency bands except the ith frequency band, where 1≤i≤k.

When in an idle state, the BSS may periodically send the service redirection broadcast message. Specifically, the BSS may send a global service redirection message (EGSRDM) in a broadcasting manner.

It should be noted that, the preset rule may be flexibly configured according to a networking requirement, or the preset rule may also be configured according to a percentage of the number of frequency points in each frequency band to the total number of frequency points. The preset rule configured according to the percentage of the number of frequency points in each frequency band to the total number of frequency points may be that: the multi-band network includes k frequency bands, where k is larger than 1; according to a value of the last digit of an IMSI and the percentage of the number of frequency points in each frequency band to the total number of frequency points, terminals in the multi-band network are classified into k groups, and a percentage of the number of terminals contained in the ith group to the total number of terminals is the same as a percentage of the number of frequency points in the ith frequency band to the total number of frequency points.

For example, the multi-band network includes a frequency band of 450 MHz and a frequency band of 800 MHz, where the number of frequency points on the frequency band of 800 MHz is 4, and the number of frequency points on the frequency band of 450 MHz is 1. That is to say, the number of frequency points on the frequency band of 800 MH accounts for 80% of the total number of frequency points, and the capacity of the frequency band of 800 MHz is 4 times the capacity of the frequency band of 450 MHz. Based on this, terminals in the multi-band network are classified into two groups, where the number of terminals in one group is 4 times the number of terminals in the other group. For example, a terminal of which the last digit of the IMSI is 1/2/3/4/6/7/8/9 is redirected to the frequency band of 800 MHz; a terminal of which the last digit of the IMSI is 0/5 is redirected to the frequency band of 450 MHz. That is to say, 80% of terminals are redirected to the frequency band of 800 MHz, and 20% of terminals are redirected to the frequency band of 450 MHz. According to the IMSI allocation, it may be considered that the number of terminals of which the last digit of the IMSI is 0/5 accounts for 20% of the total number of terminals, and the number of terminals of which the last digit of the IMSI is 1/2/3/4/6/7/8/9 accounts for 80% of the total number of terminals.

After the preset rule is determined, that is, after it is determined that a terminal of which the last digit of the IMSI is 1/2/3/4/6/7/8/9 is redirected to the frequency band of 800 MHz, and a terminal of which the last digit of the IMSI is 0/5 is redirected to the frequency band of 450 MHz, on the frequency band of 800 MHz, the BSS sends a service redirection broadcast message that is used to instruct a terminal of which the last digit of the IMSI is 0/5 to redirect to the frequency band of 450 MHz and on the frequency band of 450 MHz, the BSS sends a service redirection broadcast message that is used to instruct a terminal of which the last digit of the IMSI is 1/2/3/4/6/7/8/9 to redirect to the frequency band of 800 MHz.

Through the service redirection, cross-band idle load balancing can be implemented.

Step 202: A terminal redirects to a corresponding frequency band according to the service redirection broadcast message.

After the terminal receives the service redirection broadcast message, the terminal redirects to a corresponding frequency band supported by the terminal according to the redirection broadcast message. According to the example in step 201, a terminal that originally resides on the frequency band of 450 MHz and of which the last digit of the IMSI is 1/2/3/4/6/7/8/9 redirects to the frequency band of 800 MHz, and a terminal that originally resides on the frequency band of 800 MHz and of which the last digit of the IMSI is 0/5 redirects its corresponding frequency band to the frequency band of 450 MHz.

Step 203: The BSS obtains a frequency band support capability of the terminal. If the terminal is a multi-band terminal, perform step 204; or if the terminal is a single-band terminal, perform step 206.

The BSS may obtain the frequency band support capability of the terminal from an MSC. When the terminal registers (for example, time registration, location area registration, and power-on/off registration may be included), the MSC may record the frequency band support capability of the terminal. Alternatively, when the terminal registers, the MSC queries the frequency band support capability of the terminal Then, the BSS may obtain the frequency band support capability of the terminal from the MSC.

The BSS queries the frequency band support capability of the terminal from a common channel and may send the queried frequency band support capability of the terminal to the MSC if the MSC does not store the frequency band support capability of the terminal. Specifically, when the MSC does not record the frequency band support capability of the terminal, the MSC, through a registration (Registration) message that carries a mobile subscriber information (for example, Mobile Subscription Information) field, triggers the BSS to query the frequency band support capability of the terminal from the common channel, and the BSS notifies the MSC of a query result through a mobile subscriber information field in a location update request (Location Updating Request) message. Then, the MSC records the frequency band support capability of the terminal into mobile subscriber information.

Step 204: The BSS obtains the corresponding frequency band for the terminal according to the preset rule, and pages the terminal on the obtained corresponding frequency band. If the paging fails, perform step 205; or if the paging succeeds, the process ends.

According to the preset rule, the BSS may obtain the corresponding frequency band for the terminal, that is, the BSS may obtain the frequency band where the terminal currently resides. Then, the BSS hashes (hash) a frequency point on the frequency band and pages the terminal on the frequency point.

Step 205: The BSS pages the terminal on all frequency bands supported by the terminal.

If the paging in step 204 fails, the BSS hashes a frequency point on each of all the frequency bands supported by the terminal for paging the terminal.

It should be noted that, if an MSC fails to obtain a frequency band support capability of a terminal, the MSC, when paging the terminal, hashes a frequency point on each of all frequency bands of the multi-band network for performing paging.

Step 206: The BSS hashes a frequency point on a frequency band supported by the single-band terminal for paging the terminal.

In the embodiment of the present invention, a BSS sends a service redirection broadcast message according to a preset rule, so as to enable a terminal to redirect to a corresponding frequency band according to the service redirection broadcast message; the BSS obtains a frequency band support capability of the terminal, and then the BSS obtains a corresponding frequency band for a multi-band terminal according to a preset rule, and pages the multi-band terminal on the obtained frequency band. The BSS sends the redirection broadcast message to the multi-band terminal according to the preset rule. Therefore, for a multi-band terminal, the BSS, according to the rule, can determine a redirected frequency band for the multi-band terminal. In this way, the BSS can page the multi-band terminal on the corresponding frequency band, thereby accurately paging the multi-band terminal and reducing consumption of network capacity. This embodiment enables the multi-band terminal to redirect to a frequency band in proportion to the capacity of each frequency band; therefore, network load can be balanced. In addition, according to an IMSI of the terminal, the BSS can determine a frequency band where the multi-band terminal currently resides, thereby accurately paging the multi-band terminal and reducing the paging load of a system.

Persons of ordinary skill in the art may understand that, all or a part of the steps of the methods in the embodiments may be implemented by a program instructing relevant hardware. The program may be stored in a computer readable storage medium. When the program is run, the steps of the methods in the embodiment are performed. The storage medium includes various mediums capable of storing program codes, such as a ROM, a RAM, a magnetic disk, and an optical disk.

Figure 3:
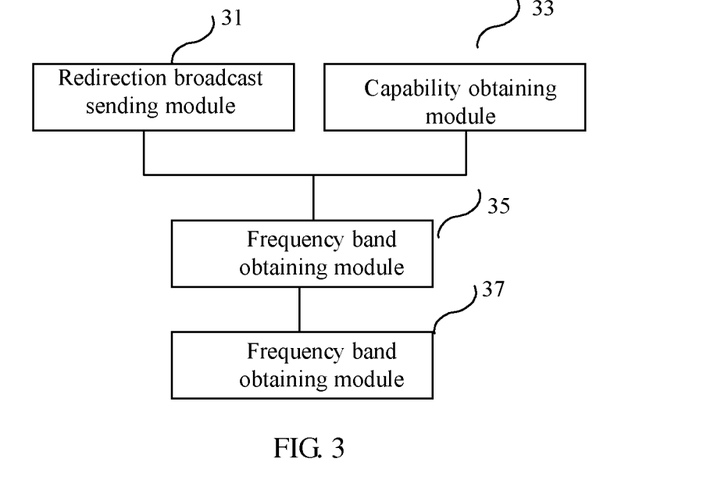
FIG. 3 is a schematic diagram of an apparatus for paging a terminal in a multi-band network according to Embodiment 1 of the present invention.

FIG. 3 is a schematic diagram of an apparatus for paging a terminal in a multi-band network according to Embodiment 1 of the present invention. As shown in FIG. 3, the apparatus includes a redirection broadcast sending module 31, a capability obtaining module 33, a frequency band obtaining module 35, and a first paging module 37.

The redirection broadcast sending module 31 is configured to send a service redirection broadcast message according to a preset rule, so as to enable a terminal to redirect to a corresponding frequency band according to the service redirection broadcast message.

The capability obtaining module 33 is configured to obtain a frequency band support capability of the terminal, where the frequency band support capability is information about one or multiple frequency bands supported by the terminal.

The frequency band obtaining module 35 is configured to: if the terminal supports multiple frequency band, obtain the corresponding frequency band for the terminal according to the preset rule.

The first paging module 37 is configured to page the terminal on the corresponding frequency band which is obtained by the frequency band obtaining module 35.

For a working procedure and working principle of each module in this embodiment, reference is made to the description in the foregoing method embodiments, and details are not described herein again.

In the embodiment of the present invention, a redirection broadcast sending module sends a service redirection broadcast message according to a preset rule, so as to enable a terminal to redirect to a corresponding frequency band according to the service redirection broadcast message; a capability obtaining module obtains a frequency band support capability of the terminal, and then a frequency band obtaining module obtains a corresponding frequency band for the multi-band terminal according to the preset rule, and a first paging module pages the terminal on the obtained corresponding frequency band. In a multi-band network provided in this embodiment, the apparatus for paging a terminal sends the redirection broadcast message to the terminal according to the preset rule. Therefore, for a multi-band terminal, the apparatus, according to the preset rule, can determine a redirected frequency band for the terminal. In this way, the apparatus can page the terminal on the frequency band, thereby accurately paging the terminal and reducing consumption of network capacity.

Figure 4:
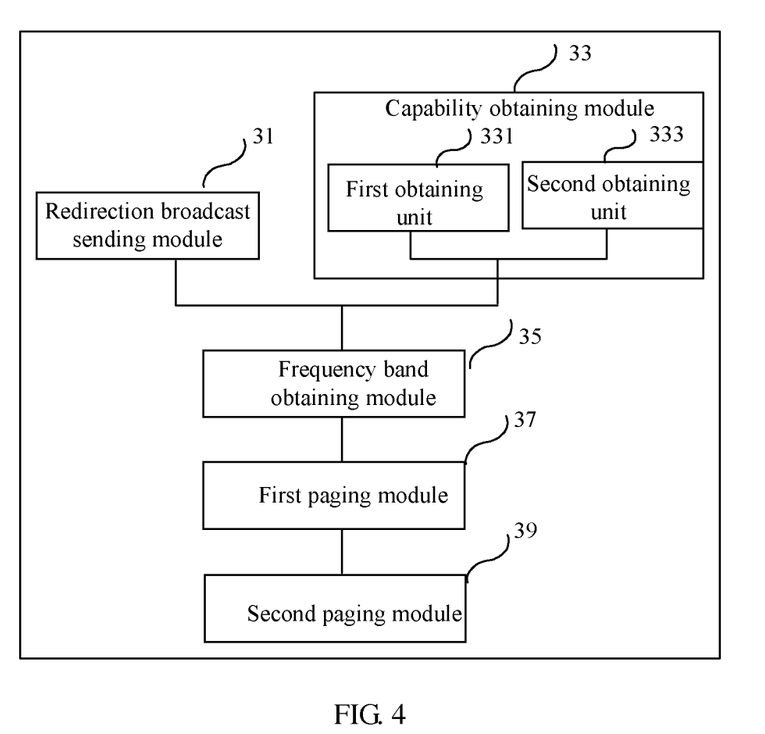
FIG. 4 is a schematic diagram of an apparatus for paging a terminal in a multi-band network according to Embodiment 2 of the present invention.

FIG. 4 is a schematic diagram of an apparatus for paging a terminal in a multi-band network according to Embodiment 2 of the present invention. On the basis of the embodiment shown in FIG. 3, as shown in FIG. 4:

The redirection broadcast sending module 31 may be specifically configured to: on the ith frequency band, send a service redirection broadcast message that is used to instruct k-1 groups of terminals except the ith group of terminals to separately redirect to k-1 frequency bands except the ith frequency band, so that terminals redirect to corresponding frequency bands according to the service redirection broadcast message, where $1 \leq i \leq k$.

The preset rule may be that: the multi-band network includes k frequency bands, where k is larger than 1; terminals in the multi-band network are classified into k groups, and k groups of the terminals separately correspond to k frequency bands.

Furthermore, the preset rule may be specifically that: the multi-band network includes k frequency bands, where k is larger than 1; according to a value of the last digit of an IMSI and a percentage of the number of frequency points in each frequency band to the total number of frequency points, terminals in the multi-band network are classified into k groups, and a percentage of the number of terminals contained in the ith group to the total number of terminals is the same as a percentage of the number of frequency points in the ith frequency band to the total number of frequency points.

The apparatus may further include a second paging module 39.

The second paging module 39 is configured to page the terminal on all frequency bands supported by the terminal if the first paging module 37 fails to page the terminal on the obtained corresponding frequency for the terminal.

Furthermore, the capability obtaining module 33 may include a first obtaining unit 331 and/or a second obtaining unit 333.

The first obtaining unit 331 is configured to obtain the frequency band support capability of the terminal from a mobile switching center.

The second obtaining unit 333 is configured to query the frequency band support capability of the terminal from a common channel and send the queried frequency band support capability of the terminal to the mobile switching center if the mobile switching center does not store the frequency band support capability of the terminal.

For a working procedure and working principle of each module and unit in this embodiment, reference is made to the description in the foregoing method embodiments, and details are not described herein again.

An apparatus for paging a terminal that is provided in the embodiment of the present invention sends a redirection broadcast message to a terminal according to a preset rule. Therefore, for a multi-band terminal, the apparatus for paging a terminal, according to the rule, can determine a redirected frequency band for the multi-band terminal. In this way, the apparatus for paging a terminal can page the multi-band terminal on the frequency band, thereby paging the multi-band terminal accurately and reducing consumption of network capacity. This embodiment enables the multi-band terminal to redirect to a frequency band in proportion to the capacity of each frequency band; therefore, network load can be balanced. In addition, according to an IMSI of the multi-band terminal, the apparatus for paging a multi-band terminal can determine a frequency band where the multi-band terminal currently resides, thereby accurately paging the multi-band terminal and reducing the paging load of a system.

An embodiment of the present invention further provides a base station subsystem, including any one of the apparatuses for paging a terminal in a multi-band network that are provided by the embodiments shown in FIG. 3 and FIG. 4.

For a working procedure and working principle of each module in this embodiment, reference is made to the description in the foregoing method embodiments, and details are not described herein again.

In the embodiment of the present invention, the BSS sends a redirection broadcast message to a terminal according to a preset rule. Therefore, for a multi-band terminal, the BSS, according to the preset rule, can determine a redirected frequency band for the multi-band terminal. In this way, the BSS can page the multi-band terminal on the frequency band, thereby accurately paging the multi-band terminal and reducing consumption of network capacity.

Finally, it should be noted that, the foregoing embodiments are merely intended for describing the technical solutions of the present invention rather than limiting the present invention. Although the present invention is described in detail with reference to the foregoing embodiments, persons of ordinary skill in the art should understand that, they may still make modifications to the technical solutions described in the foregoing embodiments or make equivalent replacements to some technical features thereof, as long as these modifications or replacements do not make the essence of corresponding technical solutions depart from the spirit and scope of the technical solutions of the embodiments of the present invention.

What is claimed is:

1. A method for paging a terminal in a multi-band network, comprising:
    obtaining a frequency band support capability of the terminal, wherein the frequency band support capability indicates whether the terminal supports one or multiple frequency bands;
    obtaining, when the terminal supports multiple frequency bands and the terminal is redirected to a corresponding frequency band supported by the terminal according to a service redirection broadcast message, the corresponding frequency band according to a preset rule; and
    paging the terminal on the corresponding frequency band,
    wherein the method further comprises sending the service redirection broadcast message according to the preset rule to enable the terminal to redirect to the corresponding frequency band, and
    wherein the preset rule is that: the multi-band network comprises k frequency bands, wherein k is larger than 1, terminals in the multi-band network are classified into k groups, and k groups of the terminals separately correspond to the k frequency bands; and the sending the service redirection broadcast message according to the preset rule comprises:
    on the ith frequency band, sending the service redirection broadcast message to instruct k-1 groups of terminals except the ith group of terminals to separately redirect to k-1 frequency bands except the ith frequency band, wherein 1 ≤i≤k.

2. The method for paging a terminal in a multi-band network according to claim 1, wherein the preset rule is:
    the multi-band network comprises k frequency bands, wherein k is larger than 1; and
    according to a value of the last digit of an IMSI and a percentage of a number of frequency points in each frequency band to a total number of frequency points, terminals in the multi-band network are classified into k groups, and a percentage of a number of terminals contained in the ith group to a total number of terminals is the same as a percentage of the number of frequency points in the ith frequency band to the total number of frequency points.

3. The method for paging a terminal in a multi-band network according to claim 1, further comprising:
    paging the terminal on all frequency bands supported by the terminal when the paging the terminal on the corresponding frequency band fails.

4. The method for paging a terminal in a multi-band network according to claim 1, wherein the obtaining the frequency band support capability of the terminal comprises:
    obtaining the frequency band support capability of the terminal from a mobile switching center.

5. The method for paging a terminal in a multi-band network according to claim 1, wherein the obtaining the frequency band support capability of the terminal comprises:
    querying the frequency band support capability of the terminal from a common channel and sending the queried frequency band support capability of the terminal to a mobile switching center when the mobile switching center does not store the frequency band support capability of the terminal.

6. An apparatus for paging a terminal in a multi-band network, comprising:
    a redirection broadcast sending module, configured to send a service redirection broadcast message according to a preset rule, so as to enable a terminal to redirect to a corresponding frequency band supported by the terminal according to the service redirection broadcast message;
    a capability obtaining module, configured to obtain a frequency band support capability of the terminal, wherein the frequency band support capability indicates whether the terminal supports one or multiple frequency bands;
    a frequency band obtaining module, configured to obtain, when the terminal supports multiple frequency bands, the corresponding frequency band for the terminal according to the preset rule; and
    a first paging module, configured to page the terminal on the corresponding frequency band which is obtained by the frequency band obtaining module,
    wherein the preset rule is that: the multi-band network comprises k frequency bands, wherein k is larger than 1, terminals in the multi-band network are classified into k groups, and k groups of the terminals separately correspond to k frequency bands; and the redirection broadcast sending module is configured to:
    on the ith frequency band, send the service redirection broadcast message that is used to instruct k-1 groups of terminals except the ith group of terminals to separately redirect to k-1 frequency bands except the ith frequency band, so as to enable the terminals to redirect corresponding frequency bands according to the service redirection broadcast message, wherein 1 ≤i ≤k.

7. The apparatus for paging a terminal in a multi-band network according to claim 6, wherein the preset rule is that:
    the multi-band network comprises k frequency bands, wherein k is larger than 1; and
    according to a value of the last digit of an IMSI and a percentage of a number of frequency points in each frequency band to a total number of frequency points, terminals in the multi-band network are classified into k groups, and a percentage of a number of terminals contained in the ith group to a total number of terminals is the same as a percentage of the number of frequency points in the ith frequency band to the total number of frequency points.

8. The apparatus for paging a terminal in a multi-band network according to claim 6, further comprising:

a second paging module, configured to page the terminal on all frequency bands supported by the terminal when the first paging module fails to page the terminal on the corresponding frequency band.

9. The apparatus for paging a terminal in a multi-band network according to claim 6, wherein the capability obtaining module comprises:

a first obtaining unit, configured to obtain the frequency band support capability of the terminal from a mobile switching center; and/or a second obtaining unit, configured to query the frequency band support capability of the terminal from a common channel and send the queried frequency band support capability of the terminal to a mobile switching center when the mobile switching center does not store the frequency band support capability of the terminal.

* * * * *

UNITED STATES PATENT AND TRADEMARK OFFICE
CERTIFICATE OF CORRECTION

| | | |
|---|---|---|
| PATENT NO. | : 9,295,031 B2 | Page 1 of 1 |
| APPLICATION NO. | : 13/974492 | |
| DATED | : March 22, 2016 | |
| INVENTOR(S) | : Guang Yang et al. | |

It is certified that error appears in the above-identified patent and that said Letters Patent is hereby corrected as shown below:

Title Page
Item 60 (Related U.S. Application Data)
Delete "Provisional" and insert -- Continuation of --, therefor.

Signed and Sealed this
Thirty-first Day of May, 2016

Michelle K. Lee
*Director of the United States Patent and Trademark Office*